United States Patent Office 3,555,021
Patented Jan. 12, 1971

3,555,021
PROCESS FOR THE PREPARATION
OF HETEROCYCLIC NITRILES
Ralph H. Beutel, Colts Neck, Paul Davis, Metuchen, and Erwin F. Schoenewaldt, Watchung, N.J., assignors to Merck & Co., Inc., Rahway, N.J., a corporation of New Jersey
No Drawing. Filed Feb. 21, 1967, Ser. No. 617,506
Int. Cl. C07d 51/76
U.S. Cl. 260—250                                           12 Claims

ABSTRACT OF THE DISCLOSURE

Loweralkyl substituted saturated or partially unsaturated heterocyclic compounds are converted to the corresponding cyano substituted fully unsaturated heterocyclic compounds by reaction with ammonia and oxygen in the presence of compound oxide catalysts. Also within the scope of the invention is the conversion of alkyl substituted saturated or partially unsaturated heterocyclic compounds and their unsubstituted analogs to the corresponding fully unsaturated derivatives.

BACKGROUND OF INVENTION

(1) Field of the invention

The invention pertains to a process for the preparation of certain heterocyclic nitriles which are useful in a variety of applications, particularly in the pharmaceutical and animal health fields.

(2) Description of the prior art

Heretofore, the conversion of alkyl saturated and partially unsaturated heterocyclic compounds to the corresponding nitriles has been carried out in two stages. That is to say, the alkyl substituted fully unsaturated heterocyclic compound was prepared and then converted by various methods into the corresponding nitrile. It is the particular advantage of the present process that the intermediate alkyl substituted unsaturated heterocyclic compound need not be isolated. The entire reaction is carried out in the vapor phase over the desired catalyst. It is a remarkable feature of the present process that despite the presence of a large excess of oxygen in the reaction mixture the course of the reaction proceeds to the aromatization of the ring rather than the opening of the double bonds in the heterocyclic ring in the course of aromatization. Furthermore, while certain dehydrogenation catalysts, such as vanadium pentoxide are known to cleave alkyl substituents from the heterocyclic nucleus, the catalysts used herein do not exhibit this undesirable property. This factor is of importance not only in the principal embodiment of this invention wherein alkyl substituted heterocyclic compounds are converted to nitriles, but also in that embodiment wherein the saturated or partially unsaturated heterocyclic compound is just aromatized. The preferred starting materials of the principal embodiment of the present invention are heterocyclic compounds where the cyclic moiety is a 5 or 6 membered saturated or partially unsaturated, suitably monounsaturated, ring. The preferred heterocyclic compounds are those 5 and 6 membered systems containing at least one of the group of oxygen, sulfur and nitrogen as hetero atoms.

SUMMARY OF THE INVENTION

Alkyl substituted saturated and partially unsaturated heterocyclic compounds are converted to the corresponding fully unsaturated nitriles by a single stage reaction with ammonia and oxygen in the presence of a compound oxide catalyst.

The nitriles produced in accordance with this invention have a variety of uses particularly as intermediates in other chemical reactions. For example, the cyano pyridines produced by this process may be converted to nicotinic acid and nicotinamide which are useful in the pharmaceutical field. Similarly cyano imidazoles are also useful as intermediates in pharmaceutical preparations. The cyano thiazoles, cyano isothiazoles and cyano thiadiazoles which may be produced in accordance with the present invention may be used in the synthesis of benzimidazole derivatives which are useful in the animal health field.

DESCRIPTION OF THE PREFERRED EMBODIMENTS

In the principal embodiment of the invention the compounds are substituted with a loweralkyl group such as methyl, ethyl, propyl, butyl or pentyl radicals, wherein this loweralkyl group is attached to a carbon atom of the heterocyclic radical.

Thus heterocyclic compounds such as 2-methyl piperazine or 2-methyl dihydropyrazine may be converted to 2-cyano pyrazine as follows:

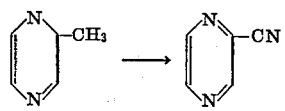

Other alkyl substituted piperazines, piperidines, pyrrolidines, tetrahydrothiophenes, tetrahydrofurans, and the like may be converted. Such compounds are exemplified by 2,5-dimethyl piperazine, 4-methyl piperidine, 3-ethyl piperidine, 3-propyl pyrrolidine, 2-methyl thiazoline, 3-propyl tetrahydrothiophene, 2-methyl imidazoline and 3-methyl tetrahydrofuran which are converted to the corresponding unsaturated nitriles such as 2,5-dicyano pyrazine, 4-cyano pyridine, 3-cyano pyridine, 3-cyano pyrrole, 2-cyano thiazole, 3-cyano thiophene, 2-cyano imidazole and 3-cyano furan.

Similarly, in another embodiment of this invention, when ammonia is not present, the following reaction, for example, may occur:

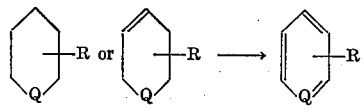

wherein R is hydrogen or loweralkyl group and Q is a hetero atom.

In this embodiment of this invention in accordance using the procedures described hereinabove where ammonia is omitted from the reaction, saturated and partially unsaturated, suitably monounsaturated, 5 or 6 membered heterocyclic compounds wherein the hetero atom is nitrogen, oxygen or sulfur and their loweralkyl derivatives may be converted to the corresponding fully unsaturated compounds without loss of the alkyl side chain. Thus, there may be converted compounds such as 2,5-dimethyl piperazine, 4-methyl piperidine, 3 ethyl piperidine, 3-propyl pyrrolidine, 2-methyl thiazoline, 3-propyl tetrahydrothiophene, 2-methyl imidazoline and 3-methyl tetrahydrofuran to the corresponding 2,5-dimethyl pyrazine, 4-methyl pyridine, 3-ethyl pyridine, 3-propyl pyrrole, 2-methyl thiazole, 3-propyl thiophene, 2-methyl imidazole and 3-methyl furan.

In practicing the embodiment of this invention when an unsaturated heterocyclic nitrile is formed from a saturated or partially unsaturated substituted heterocyclic compound, a vapor mixture containing oxygen, ammonia and the compound to be converted is first formed. For this purpose, it is convenient to bubble a stream of air subsurface into a carburetor flask containing the compound to be converted. The flask is maintained at a temperature sufficient to provide the desired amount of the vaporized compound vapor with the particular air flow rate being used. Ordinarily temperatures in the range of from 50° C. to the boiling temperature of the compound will be suitable. This mixture is then mixed with a stream of ammonia and the entire stream allowed to pass through suitable catalytic reactor equipment of the kind well known in the art, wherein it comes in contact with the heated catalyst. An exothermic reaction takes place resulting in dehydrogenation of the heterocyclic moiety and in the ammoxidation of the lower alkyl substituent directly to the cyano group. When the lower alkyl group contains more than one carbon atom, the reaction effects the cleavage of the alkyl moiety such that the carbon atom attached to the cyclic nucleus is the one which is converted to the cyano group. The resulting nitrile compound may then be separated from the unreacted components of the gaseous stream by techniques well known in the art. The unreacted components are then available for recycling through the heated catalyst bed as many times as desired. Any recycling should, of course, be carried out according to general principles of engineering practice whereby the accumulation of reaction by-products is limited and the concentration of components in the entering gas stream is maintained at a level not detrimental to a good yield.

The catalysts used in the process of the present invention are termed compound oxides. As is known, the term "compound oxide" indicates a chemical union between the oxides of two or more metals. The compounds so designated are discrete chemical compounds. For purposes of nomenclature these compounds are deemed to consist of one metal as a cation chemically united with the oxide of another metal as the anion. For example, in the catalysts the cationic metals are cobalt, vanadium and molybdenum. The metallic oxides commonly designated as acidic oxides are those of vanadium and molybdenum. Thus, the compounds represented by the combination of the above materials include cobalt molybdate, vanadium molybdate, and cobalt vanadate. These catalysts may be prepared in general by techniques well known in the art. For example, one method comprises reacting a soluble metallic salt of the desired cation with a soluble salt containing the vanadate or molybdate ion to obtain the catalyst. Thus, cobalt molybdate may be precipitated by reacting a solution of cobalt sulfate or nitrate with ammonium molybdate in aqueous ammoniacal medium. Where it is desired to form the catalysts on a support material, the precipitation is allowed to take place in the presence of the support material in the form of a suspension in the reacting solution.

Prior to their use in the instant process, it is preferred that the catalysts be fired at elevated temperatures so as to eliminate any combustibles present therein. The firing also serves to eliminate any ammonium ion which may have been incorporated into the catalyst as a result of the ammonium anion preparation hereinabove mentioned. This is not a critical step however, and the firing may be accomplished in situ when the oxidation is carried out. In situ firing however may lead to a lowering of the yields or possibly a contamination problem and for this reason is not preferred.

The catalysts may also contain some suitable material which may act as a moderator during the course of the reaction. This is desirable since the process of the present invention is exothermic and requires some control of conditions for purposes of safety. Suitable for the purpose of acting as moderators are the alkali metal salts such as potassium sulfate; alkaline earth metal oxides such as calcium oxide and barium oxide and the like. The commonly employed method of injecting water vapor into the process gas stream so as to act as a moderator may also be used where the presence of said water is not detrimental to the starting material or the product produced therefrom.

The catalyst is preferably employed in the reaction system as the bulk material itself without a support. Support materials may be used however if desired. In this regard such materials as silica, alumina, pumice, calcium sulfate and magnesium oxide and other conventional vehicles may be used. When a support is used, it is preferred to use fired alumina.

The surface area of the catalyst is not critical and is limited only by that which may be obtained from a laboratory preparation or by those commercially available. Preferably however the catalysts, whether supported or unsupported, desirably have a surface area in the range of 0.25 to 25 meters$^2$/gram.

The process of the present invention is carried out at elevated temperatures. The particular temperatures to be used vary according to the volatility of the starting material. Suitable results will be obtained when temperatures of the order of 300–500° C. are employed. The pressure at which the reaction takes place is not critical, atmospheric or pressures slightly above atmospheric being suitable.

The process of the invention requires the presence of oxygen and ammonia. The oxygen may be supplied from any convenient source, air being generally the most accessible and inexpensive means. Synthetic air mixtures, such as oxygen-enriched air or nitrogen-enriched air may also be employed where it is desired to alter the vapor flow rates, gas stream composition or either of these to affect space velocity and vapor contact time. With regard to the amount of oxygen to be employed, a range of from 5 to 100 moles per mole of starting material yields suitable results. For optimum results however, a range of from 10 to 40 moles of oxygen per mole of starting material is particularly suitable. It will be understood however that these ranges are merely illustrative and departure may be made therefrom. The amount of ammonia present is suitable between 0.5 and to 10 moles per mole of starting material with the preferred operating range being between 1 and 3 moles per mole of starting material. Here again, departure may be made from the indicated ranges with due regard for the economic feasibility thereof.

The conversion of the starting material and yield of the desired product is dependent upon the length of time that the starting material contacts the catalyst. This contact time is generally measured from the reaction conditions employed in the process and is conveniently expressed as the reciprocal of space velocity. By space velocity is meant the volume of vapor mixture measured at standard conditions passing over the heated catalyst per unit time divided by the apparent volume of the catalyst. In general, the process of the present invention will yield optimum results when a relatively short contact time is employed. Therefore, although contact times of up to 30 seconds may be employed, best results are obtained when contact times less than 1 second and most desirably between 0.05 and 0.5 second are employed.

After the reaction has been carried out in the manner above-indicated, the effluent from the reaction system is passed through a water condenser, a water scrubber, or a dilute acid scrubber to condense the products in the process stream. The final product may then be isolated from the unreacted components and by-products by techniques well known in the art, such as by fractional distillation, solvent extraction and the like.

There has been described a method for converting a lower alkyl substituted saturated or partially unsaturated heterocyclic compound to the corresponding unsaturated heterocyclic nitrile. The compounds thus obtained are useful in a wide variety of applications. For example, having the very reactive cyano group present, they may take part in a wide variety of chemical reactions. In this manner, the cyanopyridines may be converted to nicotinic acid or nicotinamide and used in the pharmaceutical field. Further, the preparation of cyanoimidazoles allows for a wide variety of possible reactions in preparing compounds which are useful as intermediates in pharmaceutical preparations. The cyanothiazoles, isothiazoles and thiadiazoles produced in accordance with the present invention may be used in the synthesis of benzimidazole derivatives which are useful in the animal health field.

In another embodiment of this invention in accordance with the procedures described hereinabove where ammonia is omitted from the reaction saturate and partially unsaturated, suitably monounsaturated, 5 or 6 membered heterocyclic compounds wherein the hetero atoms may be nitrogen, oxygen or sulfur, and their loweralkyl derivatives may be connected to the corresponding fully unsaturated compounds without loss of the alkyl side chain.

The following examples are given for the purpose of illustration and not by way of limitation.

Example I.—A vapor mixture feed of nitrogen and 3-methyl piperidine is formed by bubbling nitrogen at the rate of 120 ml./min. through 3-methyl piperidine in a carburetor maintained at 51–52° C. 3-methyl piperidine is thus vaporized at the rate of 2 g./hr. This gas mixture is then mixed with a stream of ammonia gas (1.03 liters/hr.) and another of air (4.16 liters/min.). The mixed gas stream is then fed into the bottom of a quartz reactor (10 mm. I.D., 10" long) and immersed in a eutectic salt mixture maintained at 375° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 410° C. After 4⅔ hours of operations, 9.4 g. of 3-methyl piperidine having been vaporized into the reactor, the reaction may be discontinued and the condenser system rinsed out with methanol. Concentration of this extract yields crystalline 3-cyano pyridine. Additional product is obtained by neutralization of the acid scrubber solution, extraction with methylene chloride and concentration of the extract. There is obtained by this means 5.69 g. of 3-cyano pyridine.

In accordance with the above procedure but starting with 4-methyl piperidine or 3-propyl piperidine, there is obtained 4-cyano pyridine and 3-cyano pyridine.

Example II.—A vapor mixture feed of nitrogen and 2-methyl piperazine is formed by bubbling nitrogen at the rate of 180 ml./min. through 2-methyl piperazine in a carburetor maintained at 98° C. 2-methyl piperazine is thus vaporized at the rate of 4.06 g./hr. This gas mixture is then mixed with a stream of ammonia gas (1.03 liters/hr.) and another of air (4.16 liters/min.). The mixed gas stream is then fed into the bottom of a quartz reactor (10 mm. I.D., 10" long) and immersed in a eutectic salt mixture maintained at 365° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 430° C. After 5 hours of operations, 20.3 g. of 2-methyl piperazine having been vaporized into the reactor, the reaction may be discontinued and the condenser system rinsed out with methanol. Concentration of this extract yields crystalline 2-cyano pyrazine. Additional product is obtained by neutralization of the acid scrubber solution, extraction with methylene chloride and concentration of the extract. There is obtained by this means 5.24 g. of 2-cyano pyrazine.

In accordance with the above procedure, but using 2-methyl thiazolidine, 2-methyl pyrrolidine or 3-methyl tetrahydrothiophene in place of 2-methyl piperazine, there is obtained 2-cyano thiazole, 2-cyanopyrrole and 3-cyano thiophene.

Example III.—A vapor mixture feed of nitrogen and 2,5-dimethyl piperazine is formed by bubbling nitrogen at the rate of 130 ml./min. through 2,5-dimethyl piperazine in a carburetor maintained at 135° C. 2,5-dimethyl piperazine is thus vaporized at the rate of 9.1 g./hr. This gas mixture is then mixed with a stream of ammonia gas (1.03 liters/hr.) and another of air (4.16 liters/min.). The mixed gas stream is then fed into the bottom of a quartz reactor (10 mm. I.D., 10" long) and immersed in a eutectic salt mixture maintained at 375° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 400° C. After 2¼ hours of operations, 20.5 g. of 2,5-dimethyl piperazine having been vaporized into the reactor, the reaction may be discontinued and the condenser system rinsed out with methanol. Concentration of this extract yields 2,5-dicyano pyrazine. Additional product is obtained by neutralization of the acid scrubber solution, extraction with methylene chloride and concentration of the extract. There is obtained by this means 8.95 g. of 2,5-dicyano pyrazine.

Example IV.—A vapor mixture feed of nitrogen and 2-methyl imidazolidine is formed by bubbling nitrogen at the rate of 190 ml./min. through 2-methyl imidazolidine in a carburetor maintained at 180° C. This gas mixture is then mixed with a stream of ammonia gas (1.03 liters/hr.) and another of air (4.16 liters/min.). The mixed gas stream is then fed into the bottom of a quartz reactor (10 mm. I.D., 10" long) and immersed in a eutectic salt mixture maintained at 379° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 415° C. After 6 hours of operations, the reaction may be discontinued and the condenser system rinsed out with methanol. Concentration of this extract yields crystalline 2-cyano imidazole.

Example V.—A vapor mixture feed of nitrogen and 2-methyl thiazoline is formed by bubbling nitrogen at the rate of 180 ml./min. through 2-methyl thiazoline in a carburetor maintained at 65° C. 2-methyl thiazoline is thus vaporized at the rate of 2.2 g./hr. This gas mixture is then mixed with a stream of air (4.16 liters/min.). The mixed gas stream is then fed into the bottom of a quartz reactor (10 mm. I.D., 10" long) and immersed in a eutectic salt mixture maintained at 370° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 380° C. After 3 hours of operations, 6.6 g. of 2-methyl thiazoline having been vaporized into the reactor, the reaction may be discontinued and the condenser system drained to yield 2-methyl thiazole.

Example VI.—A vapor mixture feed of nitrogen and tetrahydrothiophene is formed by bubbling nitrogen at the rate of 180 ml./min. through tetrahydrothiophene in a carburetor maintained at 55° C. Tetrahydrothiophene is thus vaporized at the rate of 3.15 g./hr. This gas mixture is then mixed with a stream of air (4.16 liters/min.). The mixed gas stream is then fed into the bottom of a quartz reactor (10 mm. I.D., 10" long) and immersed in a eutectic salt mixture maintained at 365° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 390° C. After 2 hours of operations, 6.3 g. of tetrahydrothiophene having been vaporized into the reactor, the reaction may be discontinued and the condenser system drained to yield thiophene.

Example VII.—A vapor mixture feed of nitrogen and pyrrolidine is formed by bubbling nitrogen at the rate of 25 ml./min. through pyrrolidine in a carburetor maintained at 40° C. Pyrrolidine is thus vaporized at the rate of 1.07 g./hr. This gas mixture is then mixed with a stream of air (4.16 liters/min.). The mixed gas stream is then fed into the bottom of a quartz reactor (10 mm. I.D., 10″ long) and immersed in a eutectic salt mixture maintained at 365° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 390° C. After 3 hours of operations, 3.2 g. of pyrrolidine having been vaporized into the reactor, the reaction may be discontinued and the condenser system drained to yield pyrrole, identical with authentic material in every respect. Additional product is obtained by neutralization of the acid scrubber solution, extraction with methylene chloride and concentration of the extract. There is obtained by this means 1.2 g. of pyrrole.

In accordance with the above procedure, but starting with piperidine in place of pyrrolidine, there is obtained pyridine.

Example VIII.—A vapor mixture feed of nitrogen and 4-methyl piperidine is formed by bubbling nitrogen at the rate of 104 ml./min. through 4-methyl piperidine in a carburetor maintained at 51° C. 4-methyl piperidine is thus vaporized at the rate of 1.75 g./hr. This gas mixture is then mixed with a stream of air (4.16 liters/min.). The mixed gas stream is then fed into the bottom of a quartz reactor (10 mm. I.D., 10″ long) and immersed in a eutectic salt mixture maintained at 373° C. The reactor tube contains 20 ml. of cobalt molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 410° C. After 6 hours of operations, 10.5 g. of 4-methyl piperidine having been vaporized into the reactor, the reaction may be discontinued and the condenser system rinsed out with methanol. Concentration of this extract yields crystalline 4-cyano pyridine, M.P. 78–79° C. There is obtained by this means 3.87 g. of 4-cyano pyridine.

Example IX.—A vapor mixture feed of nitrogen and 2-methyl piperazine is formed by bubbling nitrogen at the rate of 180 ml./min. through 2-methyl piperazine in a carburetor maintained at 90–95° C. 2-methyl piperazine is thus vaporized at the rate of 2.4 g./hr. in the presence of a stream of air (4.16 liters/min.). The mixed gas stream is then fed into the bottom of a quartz reactor (10 mm. I.D., 10″ long) and immersed in a eutectic salt mixture maintained at 399–414° C. The reactor tube contains 18 ml. of cobalt vanadate on alundum catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 410° C. After 2 hours of operations, 4.8 g. of 2-methyl piperazine having been vaporized into the reactor, the reaction may be discontinued and the condenser system rinsed out with methanol. Concentration of this extract yields 2-methyl pyrazine.

In accordance with the above procedure but using vanadium molybdate in place of cobalt vanadate on alundum, there is obtained the same product.

Example X.—A vapor mixture feed of nitrogen and 3-methyl piperidine is formed by bubbling nitrogen at the rate of 120 ml./min. through 3-methyl piperidine in a carburetor maintained at 70° C. 3-methyl piperidine is thus vaporized at the rate of 2.6 g./hr. This gas mixture is then mixed with a stream of ammonia gas (1.03 liters/hr.) and another of air (3.8 liters/min.). The mixed gas stream is then fed into the bottom of a quartz reactor (10 mm. I.D., 10″ long) and immersed in a eutectic salt mixture maintained at 401–411° C. The reactor tube contains 18 ml. of vanadium molybdate catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 410° C. After 2 hours of operations, 5.2 g. of 3-methyl piperidine having been vaporized into the reactor, the reaction may be discontinued and the condenser system rinsed out with methanol. Concentration of this extract yields 3-cyano pyridine.

Example XI.—A vapor mixture feed of nitrogen and 3-methyl piperidine is formed by bubbling nitrogen at the rate of 117 ml./min. through 3-methyl piperidine in a carburetor maintained at 65° C. 3-methyl piperidine is thus vaporized at the rate of 1.16 g./hr. This gas mixture is then mixed with a stream of ammonia gas (1.03 liters/hr.) and another of air (3.8 liters/min.). The mixed gas stream is then fed into the bottom of a quartz reactor (10 mm. I.D., 10″ long) and immersed in a eutectic salt mixture maintained at 408–414° C. The reactor tube contains 20 ml. of cobalt vanadate on alundum catalyst, −8+16 mesh sandwiched between plugs of quartz wool. The exit gases pass through a conventional water-cooled condenser and receiver and are then scrubbed through dilute sulfuric acid. Operation as described maintains the catalyst bed at its hottest point at 417° C. After 2¾ hours of operations, 3.2 g. of 3-methyl piperidine having been vaporized into the reactor, the reaction may be discontinued and the condenser system rinsed out with methanol. Concentration of this extract yields 3-cyano pyridine.

What is claimed is:

1. A process for the preparation of unsaturated heterocyclic nitriles which comprises forming a vapor mixture of loweralkyl substituted saturated or monounsaturated heterocyclic compounds, wherein the heterocyclic moiety is a 5 or 6-membered heterocyclic ring characterized by having 3 to 5 carbon atoms and from 1 to 2 hetero atoms selected from the group consisting of nitrogen, oxygen and sulfur, with oxygen and ammonia and contacting said mixture with a catalyst consisting of an oxide of a metal selected from the group consisting of vanadium and molybdenum chemically combined with a metal selected from the group consisting of cobalt, vanadium and molybdenum, provided that said metal is other than the metal of the metal oxide, at a temperature in the range of from 300° C. to 500° C.

2. A process according to claim 1 wherein the heterocyclic nucleus is saturated.

3. A process according to claim 1 wherein the heterocyclic nucleus is monounsaturated.

4. A proces according to claim 1 wherein the catalyst is cobalt molybdate.

5. A process according to claim 1 wherein the catalyst is vanadium molybdate.

6. A process according to claim 1 wherein the catalyst is cobalt vanadate.

7. A process according to claim 1 for the preparation of a compound selected from the group consisting of cyano pyridines, cyano pyrazines, cyano imidazoles, cyano thiazoles, cyano thiophenes and cyano pyrroles.

8. A process for the preparation of unsaturated heterocyclic compounds and the loweralkyl substituted derivatives thereof, wherein the heterocyclic moiety is a 5 or 6-membered heterocyclic ring characterized by having 3 to 5 carbon atoms and from 1 to 2 hetero atoms selected from the group consisting of nitrogen, oxygen and sulfur, which comprises forming a vapor phase mixture of the corresponding saturated or monounsaturated heterocyclic compounds with oxygen and contacting said mixture with a catalyst consisting of an oxide of a metal selected from the group consisting of vanadium and molybdenum chemically combined with a metal selected from the group consisting of cobalt, vanadium and molybdenum, provided that said metal is other than the metal of the metal oxide, at a temperature in the range from 300° C. to 500° C.

9. A process according to claim 8 wherein the catalyst is cobalt molybdate.

10. A process according to claim 8 wherein the catalyst is vanadium molybdate.

11. A process according to claim 8 wherein the catalyst is cobalt vanadate.

12. A process according to claim 8 for the preparation of a compound selected from the group consisting of pyridine, pyrazine, imidazole, thiazole, thiophene, pyrole and furan and the loweralkyl substituted derivatives thereof.

References Cited

UNITED STATES PATENTS 3,412,136   11/1968   McClain et al. _____ 260—465.3

NICHOLAS S. RIZZO, Primary Examiner

U.S. Cl. X.R.

260—294.9, 302, 309, 326.62, 329, 346.1